United States Patent [19]
Matthews et al.

[11] Patent Number: 6,079,270
[45] Date of Patent: Jun. 27, 2000

[54] METHOD AND APPARATUS FOR GENERATING DRIVING SIGNALS FOR A VIBRATORY ROTATION SENSOR

[75] Inventors: Anthony Matthews, Santa Barbara; Guy T. Varty, Woodland Hills, both of Calif.

[73] Assignee: Litton Systems Inc., Woodland Hills, Calif.

[21] Appl. No.: 09/070,334

[22] Filed: Apr. 30, 1998

Related U.S. Application Data

[63] Continuation-in-part of application No. 08/889,865, Jul. 8, 1997, Pat. No. 5,902,930.
[51] Int. Cl.[7] .............................. G01C 19/00; G01P 9/00
[52] U.S. Cl. .................................. 73/504.02; 73/504.13
[58] Field of Search ........................... 73/504.13, 504.12, 73/504.02, 504.03, 504.04

[56] References Cited

U.S. PATENT DOCUMENTS

| | | | |
|---|---|---|---|
| 5,760,304 | 6/1998 | Lynch | 73/504.13 |
| 5,763,780 | 6/1998 | Matthews et al. | 73/504.13 |
| 5,801,310 | 9/1998 | Matthews et al. | 73/504.13 |
| 5,817,940 | 10/1998 | Kobayashi et al. | 73/504.12 |
| 5,827,966 | 10/1998 | Lynch et al. | 73/488 |

*Primary Examiner*—Richard A. Moller
*Attorney, Agent, or Firm*—Robert E. Malm

[57] ABSTRACT

The invention is a method and apparatus for generating a plurality of driving signals for a vibratory rotation sensor, the plurality of driving signals resulting in a plurality of readout signals from the vibratory rotation sensor. The method comprises the steps of determining a 2× tracking angle rate, transforming the 2× tracking angle rate into a trig function rate, transforming the trig function rate into a second trig function, and generating the plurality of driving signals utilizing the second trig function. The 2× tracking angle rate, determined from the plurality of readout signals, is the time rate of change of twice the tracking angle, the tracking angle being an angle which tracks the orientation angle of the standing-wave pattern of the vibratory rotation sensor. The trig function rate is the time rate of change of a first trig function, the first trig function being an approximation to a mathematically-exact (M-E) trig function. The M-E trig function is selected from the group consisting of the tangent of twice the tracking angle and the cotangent of twice the tracking angle. The second trig function is also an approximation to the M-E trig function.

35 Claims, 3 Drawing Sheets

METHOD AND APPARATUS FOR GENERATING DRIVING SIGNALS FOR A VIBRATORY ROTATION SENSOR

CROSS-REFERENCE TO RELATED APPLICATIONS

This application is a continuation-in-part of application Ser. No. 08/889,865, filed Jul. 8, 1997, now U.S. Pat. No. 5,903,930.

BACKGROUND OF THE INVENTION

This invention relates generally to vibratory rotation sensors and more specifically to methods for generating driving signals for such rotation sensors.

A prior-art vibratory sensor (VRS) 10 consisting of an outer member 12, a hemispherical resonator 14, and an inner member 16, all made of fused quartz and joined together with indium, is shown unassembled in FIG. 1. The inertially-sensitive element is the thin-walled, 5.8-cm-diameter hemispherical resonator 14 positioned between the outer member 12 and the inner member 16 and supported by the stem 26.

A ring forcer electrode 20 and sixteen discrete forcer electrodes 22 are deposited on the interior surface of the outer member 12. In the assembled VRS 10, the ring forcer electrode 20 and the sixteen discrete forcer electrodes 22 are in close proximity to the exterior metalized surface 32 of the hemispherical resonator 14. In the assembled VRS, eight pickoff electrodes 24 deposited on the inner member 16 are in close proximity to he interior metalized surface 30 of the hemispherical resonator 14.

Capacitive forces can be exerted on the hemispherical resonator 14 by means of appropriate forcing voltage differences between the hemispherical resonator 14 and the ring forcer electrode 20 to cause the hemispherical resonator to vibrate in the lowest-order inextensional (or flexing) mode. A standing wave is established having four antinodes at 90-degree intervals about the circumference with four nodes offset by 45 degrees from the four antinodes. The 0-degree and 180-degree antinodal points oscillate 180 degrees out of phase with 90-degree and the 270-degree antinodal points. The standing wave causes the shape of the rim of the hemispherical resonator to change from circular to elliptical (with semi-major axis through the 0-degree/180-degree antinodes) to circular to elliptical (with semi-major axis through the 90-degree/270-degree antinodes.

Rotation of the VRS 10 about an axis normal to the plane of the hemispherical-resonator rim 34 causes the standing wave to rotate in the opposite direction with respect to the VRS by an angle proportional to the angle of rotation of the VRS 10. Thus, by measuring the angle of rotation of the standing wave with respect to the VRS 10, one can determine the angle of rotation of the VRS 10.

The vibrational mode of the hemispherical resonator 14 is excited by placing a DC bias voltage on the hemispherical resonator 14 and an AC voltage on the ring forcer electrode 20, the frequency of the AC voltage being twice the resonant frequency of the hemispherical resonator 14.

The standing-wave pattern angle with respect to the VRS 10 is determined by measuring the currents that flow into and out of the pickoff electrodes 24 as the hemispherical resonator 14 vibrates and the capacitances of the pickoff electrodes 24 with respect to the hemispherical resonator vary. An x axis signal $I_x$ is obtained from the combination $I_0-I_{90}+I_{180}-I_{270}$ where the subscripts identify the angular orientations relative to the x axis of the electrodes from which the currents originate. Similarly, a y axis signal $I_y$ is obtained from the combination $I_{45}-I_{135}+I_{225}-I_{315}$. The tangent of twice the standing-wave pattern angle with respect to the 0-degree (i.e. x) axis is given by the ratio of $I_y$ to $I_x$.

As a result of nonuniformities in the thickness of the hemispherical resonator 14, the establishment of a first standing wave will lead to the development of a second standing wave oscillating in phase quadrature with antinodes coinciding with the nodes of the first standing wave. The development of a second standing wave can be inhibited by placing appropriate voltages on the sixteen discrete forcer electrodes 22.

A DC bias voltage is typically maintained on the hemispherical resonator 14 in order to reduce the magnitudes of the AC forcing voltages applied to the ring forcer electrode 20 and the discrete forcer electrodes 22 and to make the force exerted on the hemispherical a linear function of the AC driving voltages. The presence of the DC bias voltage results in slow changes in the electrical properties of the VRS which have been attributed to capacitance changes caused by charge-migration phenomena taking place at or within the outer member 12 and the inner member 16. These slow changes have resulted in an unacceptably large performance degradation over time and special means have to be provided to compensate for these effects.

BRIEF SUMMARY OF THE INVENTION

The invention is a method and apparatus for generating a plurality of driving signals for a vibratory rotation sensor, the plurality of driving signals resulting in a plurality of readout signals from the vibratory rotation sensor. The method comprises the steps of determining a 2× tracking angle rate, transforming the 2× tracking angle rate into a trig function rate, transforming the trig function rate into a second trig function, and generating the plurality of driving signals utilizing the second trig function. The 2× tracking angle rate, determined from the plurality of readout signals, is the time rate of change of twice the tracking angle, the tracking angle being an angle which tracks the orientation angle of the standing-wave pattern of the vibratory rotation sensor.

The trig function rate is the time rate of change of a first trig function, the first trig function being an approximation to a mathematically-exact (M-E) trig function. The M-E trig function is selected from the group consisting of the tangent of twice the tracking angle and the cotangent of twice the tracking angle. The second trig function is also an approximation to the M-E trig function.

DETAILED DESCRIPTION OF THE INVENTION

The preferred embodiment of the invention will be described in the context of a vibratory rotation sensor for which the control and readout is accomplished with multiplexed signals. The vibratory rotation sensor which will serve in illustrating the use of the invention consists of a resonator, a housing to which the resonator is attached, and multiplex electronics. The resonator can be any rotationally-symmetric thin-walled object having standing-wave vibration modes. The prior art typically suggests that the resonator be hemispherical in shape.

Figure 1:
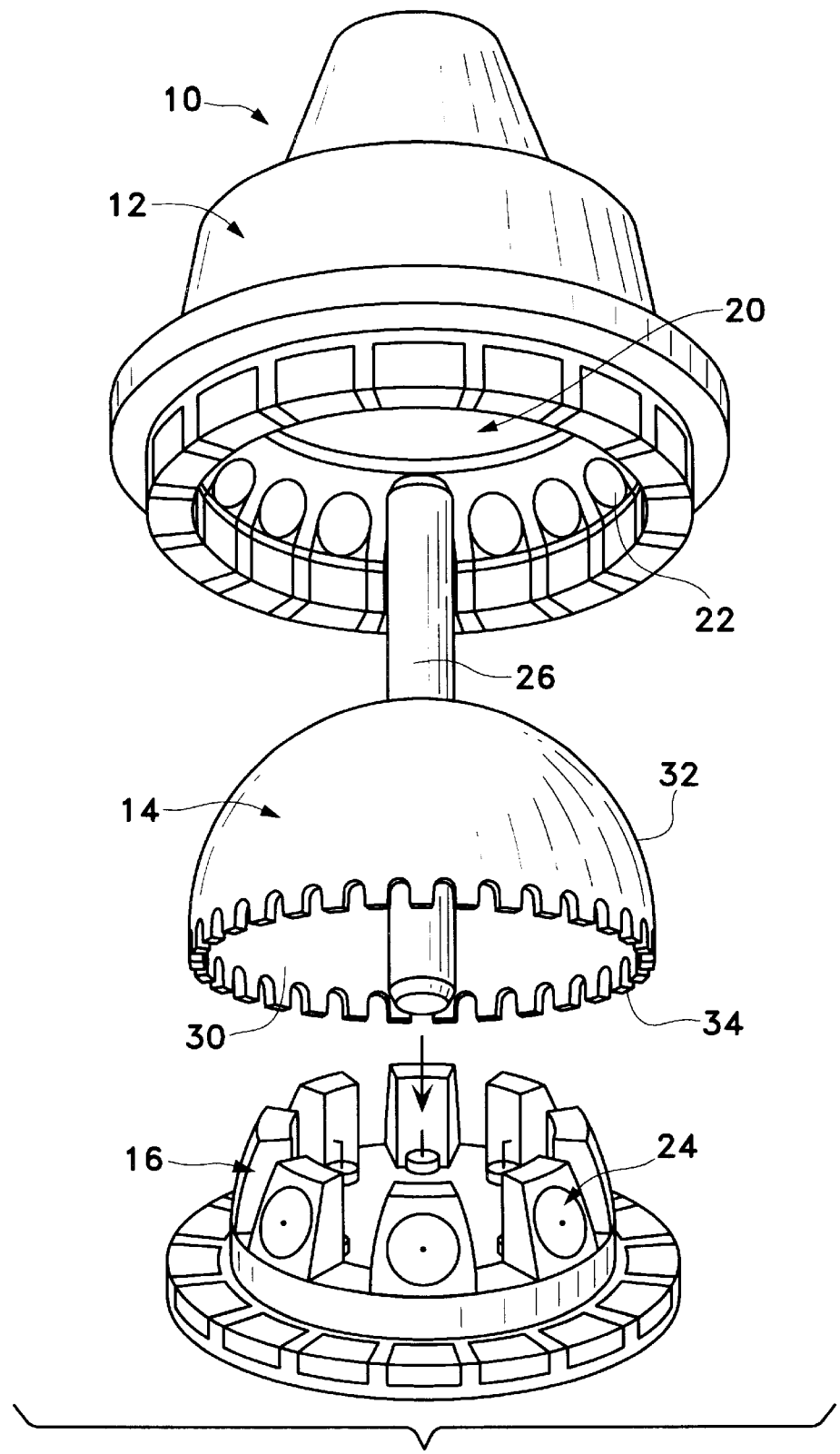
FIG. 1 shows the structure of a prior-art vibratory rotation sensor.
Figure 2:
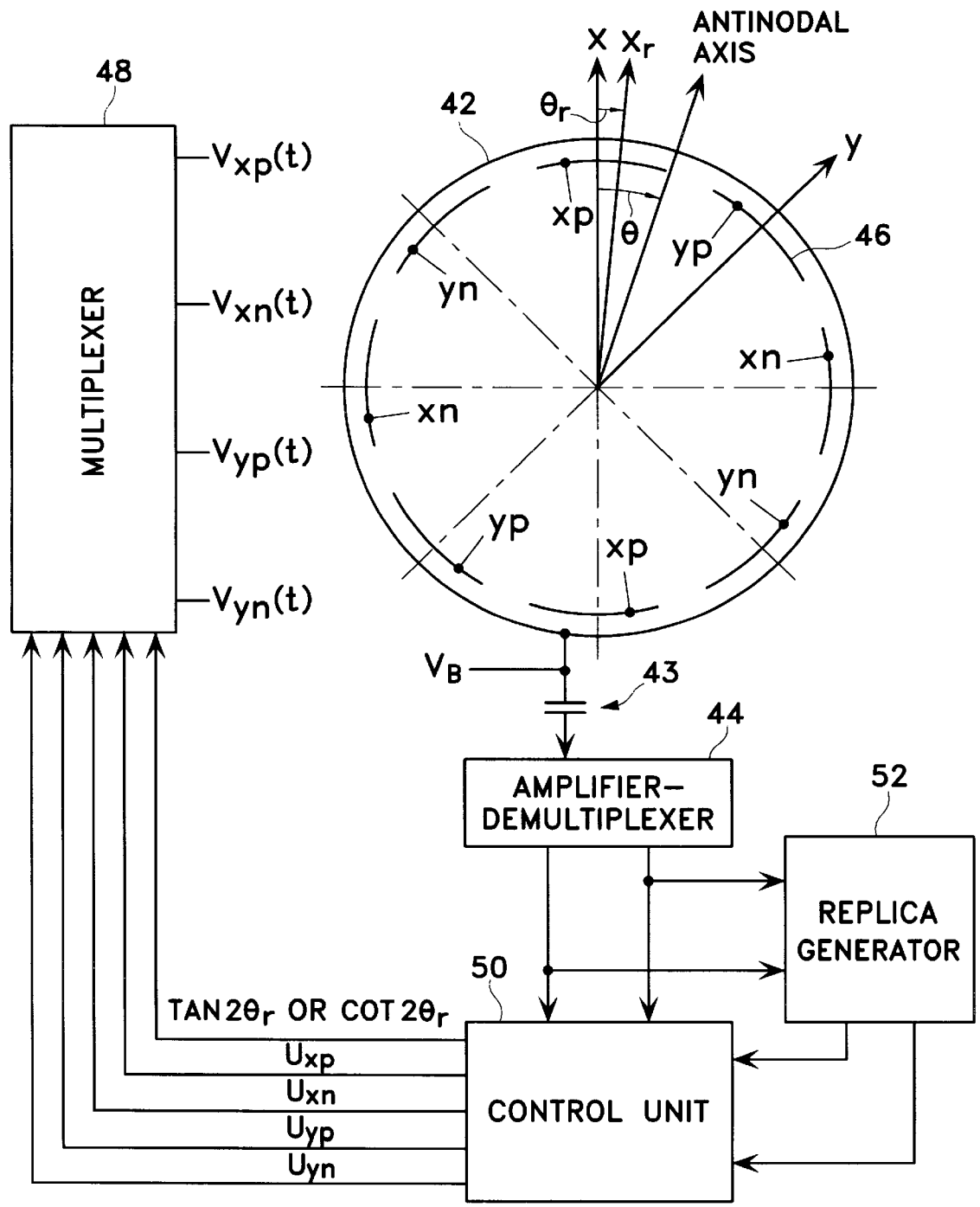
FIG. 2 shows a block diagram of the control and readout electronics for the invention.

A simplified method for determining the parameters of the standing waves and controlling the dynamics of the resonator is illustrated in FIG. 2. The standing waves are describable with respect to x and y axes fixed with respect to the resonator. The orientation of the inphase standing wave with respect to the resonator can be specified by the orientation angle θ of an inphase antinodal axis measured clockwise from the x axis. The deviation of the resonator rim from a circle along the inphase antinodal axis is assumed to vary as cos(ωt+ø) where ω is the vibration frequency, t is time, and ø is an arbitrary phase angle. The orientation of the quadrature standing wave with respect to the resonator is specified by the orientation angle θ+π/4 of a quadrature antinodal axis measured clockwise from the x axis. The deviation of the resonator rim from a circle along the quadrature antinodal axis is assumed to vary as sin(ωt+ø).

The circumferentially-continuous resonator electrode 42, deposited on the interior surface of the resonator, is biased to a DC voltage $V_B$ and is connected through a DC-blocking capacitor 43 to the amplifier-demultiplexer 44. Eight electrodes 46 attached to the VRS housing are equally spaced about the circumference in close proximity to the resonator electrode 42, the uppermost xp electrode being centered on the x-axis. The eight electrodes 46 are supplied with the driving voltages $V_{xpk}(t)$, $V_{xnk}(t)$, $V_{ypk}(t)$, and $V_{ynk}(t)$ from the multiplexer 48 where $V_{xpk}(t)=A_k(2\theta_r)V_{mxr}(t)\cos 2\theta_r \cos(\omega_{xr}t+\psi_{xr})-A_k(2\theta_r)V_{myr}(t)\sin 2\theta_r \cos(\omega_{yr}t+\psi_{yr})+V_{cx}(t)U_{xp}(t)$ $V_{xnk}(t)=-A_k(2\theta_r)V_{mxr}(t)\cos 2\theta_r \cos(\omega_{xr}t+\psi_{xr})+A_k(2\theta_r)V_{myr}(t)\sin 2\theta_r \cos(\omega_{yr}t+\psi_{yr})+V_{cx}(t)U_{xn}(t)$ $V_{ypk}(t)=A_k(2\theta_r)V_{mxr}(t)\sin 2\theta_r \cos(\omega_{xr}t+\psi_{xr})-A_k(2\theta_r)V_{myr}(t)\cos 2\theta_r \cos(\omega_{yr}t+\psi_{yr})+V_{cy}(t)U_{yp}(t)$ $V_{ynk}(t)=-A_k(2\theta_r)V_{mxr}(t)\sin 2\theta_r \cos(\omega_{xr}t+\psi_{xr})-A_k(2\theta_r)V_{myr}(t)\cos 2\theta_r \cos(\omega_{yr}t+\psi_{yr})+V_{cy}(t)U_{yn}(t)$ (1)

and $$A_1(2\theta_r) = \frac{1}{\cos(2\theta_r)} \quad (2)$$

$$A_2(2\theta_r) = \frac{1}{\sin(2\theta_r)}$$

Thus $V_{xp1}(t)=V_{mxr}(t)\cos(\omega_{xr}t+\psi_{xr})-V_{myr}(t)\tan 2\theta_r \cos(\omega_{yr}t+\psi_{yr})+V_{cx}(t)U_{xp}(t)$ $V_{xn1}(t)=-V_{mxr}(t)\cos(\omega_{xr}t+\psi_{xr})+V_{myr}(t)\tan 2\theta_r \cos(\omega_{yr}t+\psi_{yr})+V_{cx}(t)U_{xn}(t)$ $V_{yp1}(t)=V_{mxr}(t)\tan 2\theta_r \cos(\omega_{xr}t+\psi_{xr})+V_{myr}(t)\cos(\omega_{yr}t+\psi_{yr})+V_{cy}(t)U_{yp}(t)$ $V_{yn1}(t)=-V_{mxr}(t)\tan 2\theta_r \cos(\omega_{xr}t+\psi_{xr})-V_{myr}(t)\cos(\omega_{yr}t+\psi_{yr})+V_{cy}(t)U_{yn}(t)$ (3)

and $V_{xp2}(t)=V_{mxr}(t)\cot 2\theta_r \cos(\omega_{xr}t+\psi_{xr})-V_{myr}(t)\cos(\omega_{yr}t+\psi_{yr})+V_{cx}(t)U_{xp}(t)$ $V_{xn2}(t)=-V_{mxr}(t)\cot 2\theta_r \cos(\omega_{xr}t+\psi_{xr})+V_{myr}(t)\cos(\omega_{yr}t+\psi_{yr})+V_{cx}(t)U_{xn}(t)$ $V_{yp2}(t)=V_{mxr}(t)\cos(\omega_{xr}t+\psi_{xr})+V_{myr}(t)\cot 2\theta_r \cos(\omega_{yr}t+\psi_{yr})+V_{cy}(t)U_{yp}(t)$ $V_{yn2}(t)=-V_{mxr}(t)\cos(\omega_{xr}t+\psi_{xr})-V_{myr}(t)\cot 2\theta_r \cos(\omega_{yr}t+\psi_{yr})+V_{cy}(t)U_{yn}(t)$ (4)

At any particular time, the driving voltages correspond to some particular value of k. The value of k is chosen so that the magnitudes of the driving voltages remain at practical levels. For example, the k=1 driving voltages might be used for values of $2\theta_r$ between $7\pi/4$ and $\pi/4$ and between $3\pi/4$ and $5\pi/4$ where $\tan 2\theta_r$ is less than or equal to one. The k=2 driving voltages might be used for values of $2\theta_r$ between $\pi/4$ and $3\pi/4$ and between $5\pi/4$ and $7\pi/4$ where $\cot 2\theta_r$ is less than or equal to one. It should be noted that the driving voltages require the computation of only one function of the quantity $2\theta_r$ at any particular time.

The excitation voltages $V_{mxr}(t)\cos(\omega_{xr}t+\psi_{xr})$ and $V_{myr}(t)\cos(\omega_{yr}t+\psi_{yr})$ are components in the $x_r$-$y_r$ tracking-angle coordinate system of FIG. 2 (denoted by the r in the subscripts). The preferred embodiments of the excitation voltages include the sinusoids $\cos(\omega_{xr}t+\psi_{xr})$ and $\cos(\omega_{yr}t+\psi_{yr})$. There are a variety of periodic functions $F(\omega_{xr}t+\psi_{xr})$ which may be utilized instead of the sinusoids including ordinary square waves.

The $x_r$-axis is rotated clockwise from the x-axis by the tracking angle $\theta_r$. The excitation voltages are designed not to affect the parameters of a standing wave on the hemispherical. The angular frequencies $\omega_{xr}$ and $\omega_{yr}$ and phases $\psi_{xr}$ and $\psi_{yr}$ depend on the type of multiplexing being used. The forcing voltages $V_{cx}(t)U_{xp}(t)$, $V_{cx}(t)U_{xn}(t)$, $V_{cy}(t)U_{yp}(t)$, and $V_{cy}(t)U_{yn}(t)$ (expressed as components in the x-y coordinate system) cause forces to be applied to the hemispherical for the purpose of controlling the parameters of the one or more standing waves on the hemispherical. The functions $U_{xp}(t)$, $U_{xn}(t)$, $U_{yp}(t)$, and $U_{yn}(t)$ are generated by control unit 50 and supplied to multiplexer 48. The voltages $V_{cx}(t)$ and $V_{cy}(t)$ are predetermined functions used to isolate the forcing voltages from the excitation voltages.

The current I(t) flowing from the resonator electrode 42 into the amplifier-demultiplexer 44 is given by $I(t)=I_{xp}(t)+I_{xn}(t)+I_{yp}(t)+I_{yn}(t)$ (5)

where $I_{xpk}(t) = K_I[A_k V_{mxr}(t)\omega_{xr}\cos 2\theta_r\cos(\omega_{xr}t + \Psi_{xr}) -$ (6)

$A_k V_{myr}(t)\omega_{yr}\sin 2\theta_r\cos(\omega_{yr}t + \Psi_{yr}) + V_{cx}(t)\omega_{Uxp}U_{xp}(t)]C_{xp}$ $I_{xnk}(t) = K_I[-A_k V_{mxr}(t)\omega_{xr}\cos 2\theta_r\cos(\omega_{xr}t + \Psi_{xr}) +$ $A_k V_{myr}(t)\omega_{yr}\sin 2\theta_r\cos(\omega_{yr}t + \Psi_{yr}) + V_{cx}(t)\omega_{Uxn}U_{xn}(t)]C_{xn}$ $I_{ypk}(t) = K_I[A_k V_{mxr}(t)\omega_{xr}\sin 2\theta_r\cos(\omega_{xr}t + \Psi_{xr}) +$ $A_k V_{myr}(t)\omega_{yr}\cos 2\theta_r\cos(\omega_{yr}t + \Psi_{yr}) + V_{cy}(t)\omega_{Uyp}U_{yp}(t)]C_{yp}$ $I_{ynk}(t) = K_I[-A_k V_{mxr}(t)\omega_{xr}\sin 2\theta_r\cos(\omega_{xr}t + \Psi_{xr}) -$ $A_k V_{myr}(t)\omega_{yr}\cos 2\theta_r\cos(\omega_{yr}t + \Psi_{yr}) + V_{cy}(t)\omega_{Uyn}U_{yn}(t)]C_{yn}$ The capacitances $C_{xp}$, $C_{xn}$, $C_{yp}$, and $C_{yn}$ are the capacitances of the xp, xn, yp, and yn electrodes 46 with respect to the resonator electrode 42. The angular frequencies $\omega_{Uxp}$, $\omega_{Uxn}$, $\omega_{Uyp}$, and $\omega_{Uyn}$ are those associated with the corresponding U's and are typically equal to or less than $2\omega$ where $\omega$ is the resonator vibration frequency. The symbol $K_1$ denotes a constant. The phase differences between the driving voltages and the resulting currents are of no relevance and have been ignored in the equations above. The capacitances are given by $$C_{xp} = C_o[1 + d_i \cos 2\theta \cos(\omega t - \Phi) - d_q \sin 2\theta \sin(\omega t + \Phi)]$$

$$C_{xn} = C_o[1 - d_i \cos 2\theta \cos(\omega t + \Phi) + d_q \sin 2\theta \sin(\omega t + \Phi)]$$

$$C_{yp} = C_o[1 + d_i \sin 2\theta \cos(\omega t + \Phi) + d_q \cos 2\theta \sin(\omega t + \Phi)]$$

$$C_{yn} = C_o[1 - d_i \sin 2\theta \cos(\omega t + \Phi) - d_q \cos 2\theta \sin(\omega t + \Phi)] \quad (7)$$

where terms involving higher orders of $d_i$ and $d_q$ have been omitted. The effects of the higher-order terms are taken into account in subsequent processing operations. The quantity $C_o$ is the capacitance of the electrode pairs when the resonator is not excited, $d_i$ and $d_q$ are the maximum flexing amplitudes respectively of the inphase and quadrature modes divided by the gap between the resonator electrode 42 and the electrodes 46 when the resonator is not excited, $\theta$ is the angle between the antinode of the inphase standing wave and the x-axis, $\omega$ is the angular frequency of vibration of the resonator, and $\Phi$ is an arbitrary phase angle.

Substituting the expressions for the capacitances in the current equations and summing to obtain I, we obtain $$I_k(t) = \qquad (8)$$

$$2K_I C_o A_k V_{mxr}(t) \omega_{xr} \cos(\omega_{xr} t + \Psi_{xr}) d_i \cos(2\theta - 2\theta_r) \cos(\omega t + \phi) -$$

$$2K_I C_o A_k V_{mxr}(t) \omega_{xr} \cos(\omega_{xr} t + \Psi_{xr}) d_q \sin(2\theta - 2\theta_r) \sin(\omega t + \phi) +$$

$$K_I V_{cx}(t) \omega_{Uxp} U_{xp}(t) C_{xp} + K_I V_{cx}(t) \omega_{Uxn} U_{xn}(t) C_{xn} +$$

$$2K_I C_o A_k V_{myr}(t) \omega_{yr} \cos(\omega_{yr} t + \Psi_{yr}) d_i \sin(2\theta - 2\theta_r) \cos(\omega t + \phi) +$$

$$2K_I C_o A_k V_{myr}(t) \omega_{yr} \cos(\omega_{yr} t + \Psi_{yr}) d_q \cos(2\theta - 2\theta_r) \sin(\omega t + \phi) +$$

$$K_I V_{cy}(t) \omega_{Uyp} U_{yp}(t) C_{yp} + K_I V_{cy}(t) \omega_{Uyn} U_{yn}(t) C_{yn}$$

The current I(t) is transformed into the voltage V(t) by the amplifier-demultiplexer 44:

$$V_k(t) = K_v[V_{xk}(t)R_x(t) + V_{yk}(t)R_y(t)] + K_F[F_x(t) + F_y(t)] \quad (9)$$

where $K_V$ and $K_F$ are constants, $$V_x(t) = V_{mxr}(t) \omega_{xr} \cos(\omega_{xr} t + \psi_{xr})$$

$$V_y(t) = V_{myr}(t) \omega_{yr} \cos(\omega_{yr} t + \psi_{yr})$$

$$R_{xk}(t) = A_k[d_i \cos(2\theta - 2\theta_r) \cos(\omega t + \Phi) - d_q \sin(2\theta - 2\theta_r) \sin(\omega t + \Phi)]$$

$$R_{yk}(t) = A_k[d_i \sin(2\theta - 2\theta_r) \cos(\omega t + \Phi) + d_q \cos(2\theta - 2\theta_r) \sin(\omega t + \Phi)] \quad (10)$$

and $$F_x(t) = V_{cx}(t)[\omega_{Uxp} U_{xp}(t) C_{xp} + \omega_{Uxn} U_{xn}(t) C_{xn}]$$

$$F_y(t) = V_{cy}(t)[\omega_{Uyp} U_{yp}(t) C_{yp} + \omega_{Uyn} U_{yn}(t) C_{yn}] \quad (11)$$

The signals $R_{xk}(t)$ and $R_{yk}(t)$ are the desired outputs from a demultiplexing process applied to V(t) since they contain the standing wave parameters $d_i$, $d_q$, $\theta - \theta_r$, $\omega$, and $\phi$.

Signals $S_x(t)$ and $S_y(t)$ containing the signals $R_{xk}(t)$ and $R_{yk}(t)$ are extracted by amplifier-demultiplexer 44. The operating principle of the demultiplexer portion of the amplifier-demultiplexer 44 depends on the form of the voltages $V_{mxr}(t)$, $V_{myr}(t)$, $V_{cx}(t)$, and $V_{cy}(t)$ and the values of $\omega_{xr}$, $\omega_{yr}$, $\psi_{xr}$, and $\psi_{yr}$.

For frequency-division multiplexing, $V_{mxr}(t)$, $V_{myr}(t)$, $V_{cx}(t)$, and $V_{cy}(t)$ are all equal to a constant, $\omega_{xr}$, $\omega_{yr}$, and $|\omega_{xr} - \omega_{yr}|$ are greater than about 6$\omega$, and $\psi_{xr}$, and $\psi_{yr}$ are arbitrary constants. The signals $R_x(t)$ and $R_y(t)$ which contain the standing-wave parameters are obtained by performing two product demodulations of V(t), one with respect to $\cos(\omega_{xr} t + \psi_{xr})$ and the other with respect to $\cos(\omega_{yr} t + \psi_{yr})$. If a periodic function other than a sinusoid is being used, then the demodulations proceed using replicas of the periodic functions. A product demodulation consists of multiplying the input voltage by the reference sinusoid (or replica) and lowpass filtering the product, the cutoff frequency of the lowpass filter being about 3$\omega$. The results of the above process are the signals $S_{FDMx}(t)$ and $S_{FDMy}(t)$:

$$S_{FDMx}(t) = K_{FDM} R_x(t)$$

$$S_{FDMy}(t) = K_{FDM} R_y(t) \quad (12)$$

where $K_{FDM}$ is a constant. Because the upper limit to the frequency spectrums of $F_x(t)$ and $F_y(t)$ are about 3$\omega$, these quantities are eliminated by the demultiplexing process.

For phase-division multiplexing, $\omega_{xr}$ and $\omega_{yr}$ have the same value $\omega_o$, $\omega_o$ being greater than about 6$\omega$, and $\psi_{xr} - \psi_{yr}$ is equal to $\pi/2$ radians. The signals $S_{PDMx}(t)$ and $S_{PDMy}(t)$ are obtained by performing product demodulations of V(t) with respect to $\cos(\omega_o t + \psi_x)$ and with respect to $\cos(\omega_o t + \psi_y)$ (or with respect to replicas of the periodic functions being used).

$$S_{PDMx}(t) = K_{PDM} R_x(t)$$

$$S_{PDMy}(t) = K_{PDM} R_y(t) \quad (13)$$

where $K_{PDM}$ is a constant.

For one form of time-division multiplexing, $\omega_{xr}$ and $\omega_{yr}$ have the same value $\omega_o$ with $\omega_o$ being greater than about 6$\omega$ and $\psi_{xr}$, and $\psi_{yr}$ are equal to an arbitrary number $\psi_o$. The voltages $V_{mxr}(t)$ and $V_{myr}(t)$ are proportional to square waves which take on values of 0 and 1, any one of which being equal to 1 at any given time and the duration of a "1" value being equal to an integer times 2$\pi/\omega$. The voltages $V_{cx}(t)$, and $V_{cy}(t)$ are both equal to a constant. The signals $S_{TDMx}(t)$ and $S_{TDMy}(t)$ are obtained by performing a product demodulation of V(t) with respect to $\cos(\omega_o t + \psi_o)$ (or replica) followed by parallel multiplications with $V_{mxr}(t)$ and $V_{myr}(t)$:

$$S_{TDMx}(t) = K_{TDM} V_{mxr}(t) R_x(t)$$

$$S_{TDMy}(t) = K_{TDM} V_{myr}(t) R_y(t) \quad (14)$$

where $K_{TDM}$ is a constant. It should be noted that $R_x(t)$ and $R_y(t)$ are available only when $V_{mxr}(t)$ and $V_{myr}(t)$ are non-zero.

The same results are obtained (except possibly for the value of the constant $K_{TDM}$) if $V_{mxr}(t)$, $V_{myr}(t)$, $V_{cx}(t)$, and $V_{cy}(t)$ are proportional to square waves which take on values of 0 and 1, only one of the square waves being equal to 1 at any given time, and the duration of a "1" value being equal to an integer times 2$\pi/\omega$. This mode of operation may be desirable in that it completely isolates the forcing voltages $V_{cx}(t)U_{xp}(t)$, $V_{cx}(t)U_{xn}(t)$, $V_{cy}(t)U_{yp}(t)$, and $V_{cy}(t)U_{yn}(t)$ from each other and from the excitation voltages $V_{mxr}(t)\cos(\omega_o t + \psi_o)$ and $V_{myr}(t)\cos(\omega_o t + \psi_o)$.

For another form of time-division multiplexing, $\omega_o$ equals 0 and $V_{mxr}(t)$, $V_{myr}(t)$, $V_{cx}(t)$, and $V_{cy}(t)$ are proportional to square waves which take on values of 0 and 1, only one of the square waves being equal to 1 at any given time, and the duration of "1" value being equal to an integer times 2$\pi/\omega$. Multiplying V(t) in parallel operations by $V_{mxr}(t)$ and by $V_{myr}(t)$ gives the same results as in the first form of time-division multiplexing.

For code-division multiplexing, $\omega_{xr}$, $\omega_{yr}$, $\psi_{xr}$, and $\psi_{yr}$ are all equal to 0, $V_{cx}(t)$, and $V_{cy}(t)$ are constants, and $V_{mxr}(t)$ and $V_{myr}(t)$ are proportional to square waves which take on pseudo-random sequences of values of $-1/T$ and $1/T$ and satisfy the following conditions:

$$\int_T V_i V_j \, dt = \begin{cases} 1; & i=j \\ 0; & i \neq j \end{cases} \quad (15)$$

where the subscripts i and j stand for any of the subscripts mxr, myr, cx, and cy. The integration time interval T should be less than $2\pi/3\omega$. The signals $S_{CDMx}(t)$ and $S_{CDMy}(t)$ are obtained by separately multiplying V(t) by $V_{mxr}(t)$ and $V_{myr}(t)$ and then integrating over T:

$$S_{CDMx}(nT) = K_{CDM} R_x(nT)$$

$$S_{CDMy}(nT) = K_{CDM} R_y(nT) \quad (16)$$

where $K_{TDM}$ is a constant and n is an integer. It should be noted that the signals $S_{CDMx}(t)$ and $S_{CDMy}(t)$ provide information concerning the standing-wave parameters at intervals of T.

The voltages $U_x(t)$ and $U_y(t)$ typically may include three components:

$$U_{xp}(t) = U_{axp}(t) + U_{qxp}(t) + U_{rxp}(t)$$

$$U_{xn}(t) = U_{axn}(t) + U_{qxn}(t) + U_{rxn}(t)$$

$$U_{yp}(t) = U_{ayp}(t) + U_{qyp}(t) + U_{ryp}(t)$$

$$U_{yn}(t) = U_{ayn}(t) + U_{qyn}(t) + U_{ryn}(t) \quad (17)$$

where the subscripts a, q, and r identify the amplitude, quadrature, and rate control voltages. It is not necessary to isolate these components from one another in all applications. However, if isolation is desired, the following substitutions can be made in the foregoing equations.

$$V_{cax}(t)U_{axp}(t) + V_{cqx}(t)U_{qxp}(t) + V_{crx}(t)U_{rxp}(t) \text{ for } V_{cx}(t)U_{xp}(t)$$

$$V_{cax}(t)U_{axn}(t) + V_{cqx}(t)U_{qxn}(t) + V_{crx}(t)U_{rxn}(t) \text{ for } V_{cx}(t)U_{xn}(t)$$

$$V_{cay}(t)U_{ayp}(t) + V_{cqy}(t)U_{qyp}(t) + V_{cry}(t)U_{ryp}(t) \text{ for } V_{cy}(t)U_{yp}(t)$$

$$V_{cay}(t)U_{ayn}(t) + V_{cqy}(t)U_{qyn}(t) + V_{cry}(t)U_{ryn}(t) \text{ for } V_{cy}(t)U_{yn}(t) \quad (18)$$

With these substitutions, any constraints imposed on $V_{cx}(t)$ and $V_{cy}(t)$ also apply to $V_{cax}(t)$, $V_{cqx}(t)$, $V_{crx}(t)$, $V_{cay}(t)$, $V_{cqy}(t)$, and $V_{cry}(t)$. For example, equations (1) become $$V_{xp}(t) = A_k(2\theta_r)V_{mxr}(t)\cos 2\theta_r \cos(\omega_{xr}t + \Psi_{xr}) - \quad (19)$$
$$A_k(2\theta_r)V_{myr}(t)\sin 2\theta_r \cos(\omega_{yr}t + \Psi_{yr}) +$$
$$V_{cax}(t)U_{axp}(t) + V_{cqx}(t)U_{qxp}(t) + V_{crx}(t)U_{rxp}(t)$$

$$V_{xn}(t) = -A_k(2\theta_r)V_{mxr}(t)\cos 2\theta_r \cos(\omega_x rt + \Psi_{xr}) +$$
$$A_k(2\theta_r)V_{myr}(t)\sin 2\theta_r \cos(\omega_{yr}t + \Psi_{yr}) +$$
$$V_{cax}(t)U_{axn}(t) + V_{cqx}(t)U_{qxn}(t) + V_{crx}(t)U_{rxn}(t)$$

$$V_{yp}(t) = A_k(2\theta_r)V_{mxr}(t)\sin 2\theta_r \cos(\omega_{xr}t + \Psi_{xr}) +$$
$$A_k(2\theta_r)V_{myr}(t)\cos 2\theta_r \cos(\omega_{yr}t + \Psi_{yr}) +$$
$$V_{cay}(t)U_{ayp}(t) + V_{cqy}(t)U_{qyp}(t) + V_{cry}(t)U_{ryp}(t)$$

-continued
$$V_{yn}(t) = -A_k(2\theta_r)V_{mxr}(t)\sin 2\theta_r \cos(\omega_{xr}t + \Psi_{xr}) -$$
$$A_k(2\theta_r)V_{myr}(t)\cos 2\theta_r \cos(\omega_{yr}t + \Psi_{yr}) +$$
$$V_{cay}(t)U_{ayn}(t) + V_{cqy}(t)U_{qyn}(t) + V_{cry}(t)U_{ryn}(t)$$

Figure 3:
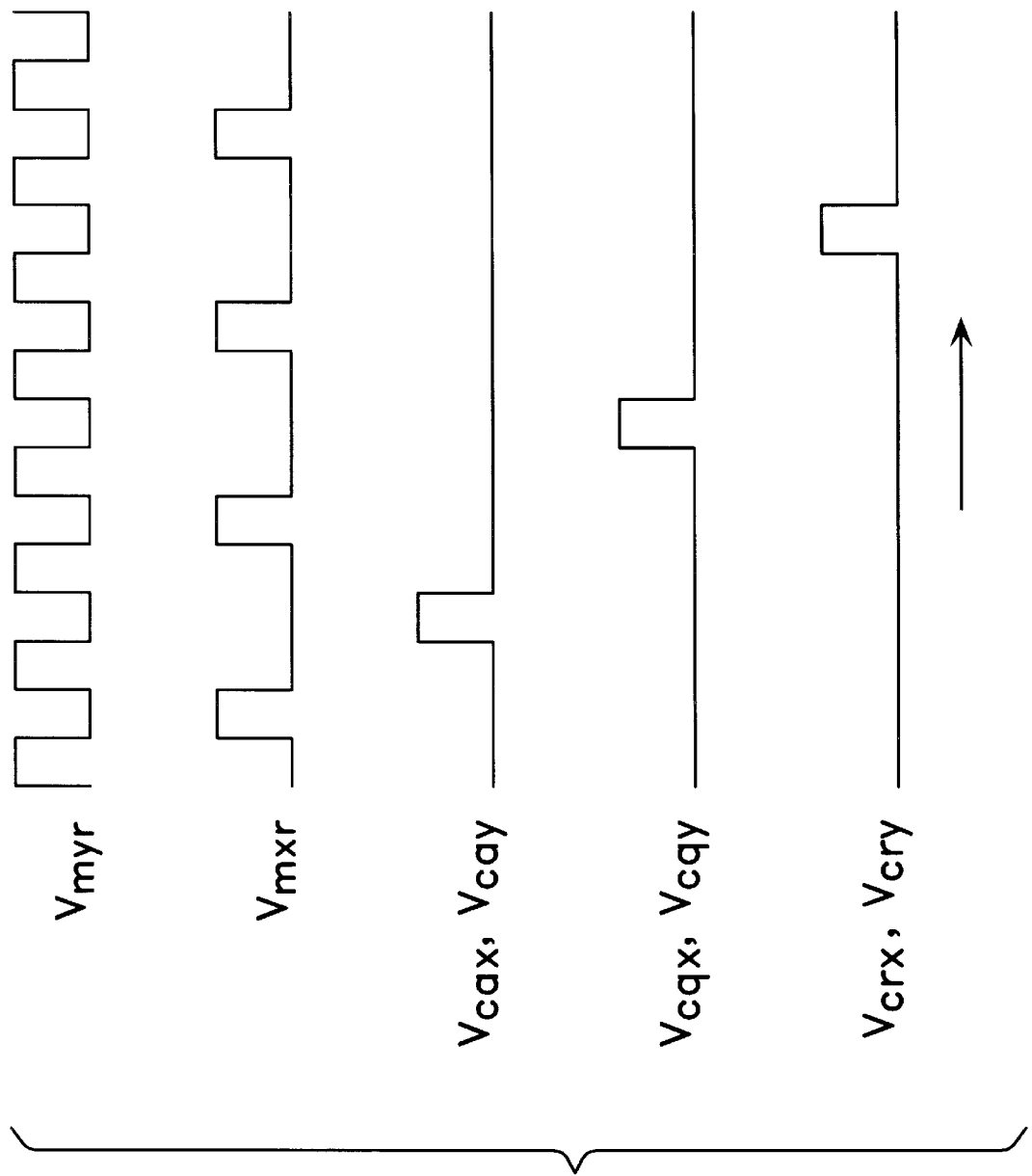
FIG. 3 shows the multiplex control signals for a particular embodiment of the invention.

One possible time-division multiplex configuration is a sixteen-slot frame of duration $32\pi/\omega$ synchronized to the flexure rate of the resonator. The multiplex control voltages are as shown in FIG. 3. When $\theta_r$ equals $\theta$, the $x_r$ axes coincide with the antinode axes and the $y_r$ axes coincide with the nodal axes. Eight slots are assigned to reading out the $y_r$ signal component, 4 slots to reading out the $x_r$ signal component, and 1 slot each to applying amplitude, quadrature, and rate forces to the resonator. For a vibration frequency of 4 kHz, readouts of the $x_r$ and $y_r$ signal components would be available at a rate of 2 kHz and 1 kHz respectively. The control voltages would be applied at a rate of 0.25 kHz.

In general, the signals $S_x(t)$ and $S_y(t)$ exiting from the amplifier-demultiplexer 44 into the control unit 50 and the replica generator 52 have the form $$S_x(t) = K_{Vx} R_x(t)$$

$$S_y(t) = K_{Vy} R_y(t) \quad (20)$$

where $K_{Vx}$ and $K_{Vy}$ each equals $K_V$ except in the case of time-division multiplexing when $K_{Vx}$ equals $K_V V_{mx}(t)$ and $K_{Vy}$ equals $K_V V_{my}(t)$.

The standing-wave parameters are extracted from the signals $S_x(t)$ and $S_y(t)$ by the control unit 50. In order to extract the standing-wave parameters from the signals $S_x(t)$ and $S_y(t)$, a stable and precise replica of the resonator vibration signals $\cos(\omega t + \emptyset)$ is required. The replica is obtained from a voltage-controlled oscillator in replica generator 52 wherein the voltage-controlled oscillator is phase-locked to the in-phase standing-wave antinodal signal. The first step of the process is to multiply $S_x(t)$ and $S_y(t)$ first by the replica signals $\cos(\omega_r t + \emptyset_r)$ and lowpass filter the results and then by the phase-shifted replica $\sin(\omega_r t + \emptyset_r)$ and lowpass filter the results. The results of this process are:

$$S_{tx}(t) = KA_k(2\theta_r)\{d_i\cos(2\theta - 2\theta_r)\cos[(\omega_r - \omega)t + (\phi_r - \phi)] + \quad (21)$$
$$d_q\sin(2\theta - 2\theta_r)\sin[(\omega_r - \omega)t + (\phi_r - \phi)]\}$$

$$S_{ty}(t) = KA_k(2\theta_r)\{d_i\sin(2\theta - 2\theta_r)\cos[(\omega_r - \omega)t + (\phi_r - \phi)] -$$
$$d_q\cos(2\theta - 2\theta_r)\sin[(\omega_r - \omega)t + (\phi_r - \phi)]\}$$

$$S_{qx}(t) = KA_k(2\theta_r)\{d_i\cos(2\theta - 2\theta_r)\sin[(\omega_r - \omega)t + (\phi_r - \phi)] -$$
$$d_q\sin(2\theta - 2\theta_r)\cos[(\omega_r - \omega)t + (\phi_r - \phi)]\}$$

$$S_{qy}(t) = KA_k(2\theta_r)\{d_i\sin(2\theta - 2\theta_r)\sin[(\omega_r - \omega)t + (\phi_r - \phi)] +$$
$$d_q\cos(2\theta - 2\theta_r)\cos[(\omega_r - \omega)t + (\phi_r - \phi)]\}$$

where K is a constant.

The next step is to form the following combinations of products of the $S_{ix}(t)$, $S_{iy}(t)$, $S_{qx}(t)$, and $S_{qy}(t)$:

$$E = S^2_{ix} + S^2_{qx} + S^2_{iy} + S^2_{qy} = (KA_k)^2(d^2_i + d^2_q)$$

$$Q = 2(S_{ix}S_{qy} - S_{iy}S_{qx}) = (KA_k)^2(2d_i d_q)$$

$$R = S^2_{ix} + S^2_{qx} - S^2_{iy} - S^2_{qy} = (KA_k)^2(d^2_i - d^2_q)\cos(4\theta - 4\theta_r)$$

$$S = 2(S_{ix}S_{iy} + S_{qx}S_{qy}) = (KA_k)^2(d^2_i - d^2_q)\sin(4\theta - 4\theta_r)$$

$$L_i = 2(S_{ix}S_{qx} + S_{iy}S_{qy}) = (KA_k)^2(d^2_i - d^2_q)\sin[2(\omega_r - \omega)t + 2(\Phi_r - \Phi)] \quad (22)$$

With $L_i(t)$ as the error signal, the phase-locked loop will lock up with the replica phase $\phi_r$ equal to $\phi$ and $\omega_r$ equal to $\omega$.

The difference between the standing-wave orientation angle and the tracking angle $\theta-\theta_r$, can be determined from the equation $$\tan(4\theta - 4\theta_r) = \frac{S(t)}{R(t)} \quad (23)$$

and the signs of $S_{ix}(t)$ and $S_{iy}(t)$. The quantity $S(t)/R(t)$ can be used as the error signal in a control loop which generates $\theta_r$ and causes an average $\theta$ to equal $\theta_r$ and $d/dt(\theta-\theta_r)$ to equal 0. The actual value of $\theta$ at any given time is given by $$\theta = \theta_r + \frac{1}{4}\tan^{-1}\frac{S(t)}{R(t)} \approx \theta_r + \frac{1}{4}\frac{S(t)}{R(t)} \quad (24)$$

The difference between $E(t)/\{A_k[2\theta_r(t)]\}^2$ and a specified number is used as the error signal in the amplitude control loop which causes the total energy in the combined inphase and quadrature standing waves, which is proportional to $d_i^2+d_q^2$, to equal the specified number.

The quantity $Q(t)$ is used as the error signal in the quadrature control loop which results in the quadrature standing-wave amplitude $d_q$ to be zero. When this loop is closed, the amplitude control loop maintains the inphase amplitude $d_i$ at a specified value.

The use of the above control variables can be shown to be optimum. It will be apparent to those skilled in the art that there are many choices of control variables that are suboptimum but still practical.

The digitally-synthesized tracking angle $\theta_r(t)$, $\theta_r$ being specifically recognized at this point as a function of time, is used in generating either $\tan[2\theta_r(t)]$ or $\cot[2\theta_r(t)]$, depending on the value of $2\theta_r(t)$, in the control unit 50. Either $\tan[2\theta_r(t)]$ or $\cot[2\theta_r(t)]$ is supplied to the multiplexer 48. Either $\cos[2\theta_r(t)]$ or $\sin[2\theta_r(t)]$ is computed from $\tan[2\theta_r(t)]$ or $\cot[2\theta_r(t)]$ and used to generate $A_k[2\theta_r(t)]$.

The generation of $\tan[2\theta_r(t)]$ or $\cot[2\theta_r(t)]$ is accomplished in the following way.

$$\tan_2[2\theta_r(t)] = \int \frac{d}{dt}\tan_1[2\theta_r(t)]dt \quad (25)$$

$$\cot_2[2\theta_r(t)] = \int \frac{d}{dt}\cot_1[2\theta_r(t)]dt \quad (26)$$

The quantities $\tan[2\theta_r(t)]$ or $\cot[2\theta_r(t)]$ without numerical subscripts represent the mathematically exact quantities that one would ideally like to use in generating the driving signals (3) and (4). The quantities $\tan_1[2\theta_r(t)]$ or $\cot_1[2\theta_r(t)]$ are generated quantities that only approximate the mathematically exact quantities because of noise and hardware limitations. The quantities $\tan_2[2\theta_r(t)]$ or $\cot_2[2\theta_r(t)]$ are also generated quantities that only approximate the mathematically precise quantities.

These equations can be rewritten as $$\tan_2[2\theta_r(t)] = \int \{1 + \tan_1^2[2\theta_r(t)]\}\frac{d}{dt}[2\theta_r(t)]dt \quad (27)$$

$$\cot_2[2\theta_r(t)] = -\int \{1 + \cot_1^2[2\theta_r(t)]\}\frac{d}{dt}[2\theta_r(t)]dt \quad (28)$$

The preferred implementation of these equations utilizes an iterative approach. The starting point is the change $\Delta[2\theta_r(n)]$ in $2\theta_r(n)$ at times t defined by $t=n\Delta t$ where n takes on integer values and $\Delta t$ is the time interval between iterations. Note that $2\theta_r(n+1)=2\theta_r(n)+\Delta[2\theta_r(n)]$.

The functions $\tan_1[2\theta_r(n)]$ or $\cot_1[2\theta_r(n)]$ are computed iteratively using the following expressions. (More complex extrapolation expressions can be used if greater accuracy is desired.)

$$\tan_1[2\theta_r(n+1)] = \tan_1[2\theta_r(n)] + \frac{d}{dt}\{\tan_1[2\theta_r(n)]\}\Delta t \quad (29)$$

$$\cot_1[2\theta_r(n+1)] = \cot_1[2\theta_r(n)] + \frac{d}{dt}\{\cot_1[2\theta_r(n)]\}\Delta t \quad (30)$$

which can be rewritten as $$\tan_1[2\theta_r(n+1)]=\tan_1[2\theta_r(n)]+\{1+\tan_1^2[2\theta_r(n)]\}\Delta[2\theta_r(n)] \quad (31)$$

$$\cot_1[2\theta_r(n+1)]=\cot_1[2\theta_r(n)]+\{1+\cot_1^2[2\theta_r(n)]\}\Delta[2\theta_r(n)] \quad (32)$$

since $$\frac{d}{dt}\{\tan_1[2\theta_r(n)]\}\Delta t = \Delta\{\tan_1[2\theta_r(n)]\} \quad (33)$$

$$= \{1+\tan_1^2[2\theta_r(n)]\}\Delta[2\theta_r(n)]$$

$$\frac{d}{dt}\{\cot_1[2\theta_r(n)]\}\Delta t = \Delta\{\cot_1[2\theta_r(n)]\} \quad (34)$$

$$= -\{1+\cot_1^2[2\theta_r(n)]\}\Delta[2\theta_r(n)]$$

The quantity $\Delta 2\theta_r[(n)]$ is the change in $2\theta_r[(n)]$ over a time interval $\Delta t$.

The quantities $\Delta\{\tan_1[2\theta_r(n)]\}$ and $\Delta\{\cot_1[2\theta_r(n)]\}$ or the quantities $\tan_1[2\theta_r(n)]$ and $\cot_1[2\theta_r(n)]$, either of which can be used to generate $\tan_2[2\theta_r(t)]$ and $\cot_2[2\theta_r(t)]$ for the multiplexer 48, can be generated in other ways. For example, $$\tan(\alpha+\beta) = \frac{\tan\alpha + \tan\beta}{1 - \tan\alpha\tan\beta} \quad (35)$$

$$= \frac{(\tan\alpha+\tan\beta)(1+\tan\alpha\tan\beta)}{1-\tan^2\alpha\tan^2\beta}$$

$$= \frac{(\tan\alpha+\tan\beta)(1+\tan\alpha\tan\beta)(1+\tan^2\alpha\tan^2\beta)}{1-\tan^4\alpha\tan^4\beta}$$

$$\cot(\alpha+\beta) = \frac{\cot\alpha - \tan\beta}{1 + \cot\alpha\tan\beta} \quad (36)$$

$$= \frac{(\cot\alpha-\tan\beta)(1-\cot\alpha\tan\beta)}{1-\cot^2\alpha\tan^2\beta}$$

$$= \frac{(\cot\alpha-\tan\beta)(1-\cot\alpha\tan\beta)(1+\cot^2\alpha\tan^2\beta)}{1-\cot^4\alpha\tan^4\beta}$$

If $\beta$ is small compared to 1, $\tan\beta$ can be replaced by $\beta$ in the numerators and by 0 in the denominators, and the final expressions above can be rewritten as $$\tan(\alpha+\beta)=(\tan\alpha+\beta)(1+\tan\alpha\beta)(1+\tan^2\alpha\beta^2) \quad (37)$$

$$\cot(\alpha+\beta)=(\cot\alpha-\beta)(1-\cot\alpha\beta)(1+\cot^2\alpha\beta^2) \quad (38)$$

These expressions are valid to order $\beta^2$.

Replacing $\alpha$ by $2\theta_r(n)$ and $\beta$ by $\Delta[2\theta_r(n)]$, we obtain an expression for $\tan_1[2\theta_r(n+1)]$ in terms of $\tan_1[2\theta_r(n)]$ and $\Delta[2\theta_r(n)]$, and an expression for $\cot_1[2\theta_r(n+1)]$ in terms of $\cot_1[2\theta_r(n)]$ and $\Delta[2\theta_r(n)]$. The quantities $\Delta\{\tan_1[2\theta_r(n)]\}$ and $\Delta\{\cot_1[2\theta_r(n)]\}$ can be determined using the following expressions.

$$\Delta\{\tan_1[2\theta_r(n)]\} = \tan_1[2\theta_r(n+1)] - \tan_1[2\theta_r(n)] \quad (39)$$

$$\Delta\{\cot_1[2\theta_r(n)]\} = \cot_1[2\theta_r(n+1)] - \cot_1[2\theta_r(n)] \quad (40)$$

One could at this point feed either of the quantities $\tan_1[2\theta_r(n)]$ or $\cot_1[2\theta_r(n)]$ (n taking on successive integer values) into a digital-to-analog converter, hold each output value for a time interval $\Delta t$ and integrate the result with respect to time. The resulting analog quantity $\tan_2[2\theta_r(t)]$ or $\cot_2[2\theta_r(t)]$ takes on the values $\tan_1[2\theta_r(n)]$ or $\cot_1[2\theta_r(n)]$ respectively for values of time $n\Delta t$ and the values at other times are linear interpolations.

An alternative is to use either $\Delta\{\tan_1[2\theta_r(n)]\}$ or $\Delta\{\cot_1[2\theta_r(n)]\}$ to specify the slope of a linear function of t during each time interval $\Delta t$:

$$\tan_2[2\theta_r(t)] = \sum_{n'<n} \Delta\{\tan_1[2\theta_r(n')]\} + \Delta\{\tan_1[2\theta_r(n)]\}\frac{t-n\Delta t}{\Delta t} \quad (41)$$

$$\cot_2[2\theta_r(t)] = \sum_{n'<n} \Delta\{\cot_1[2\theta_r(n')]\} + \Delta\{\cot_1[2\theta_r(n)]\}\frac{t-n\Delta t}{\Delta t} \quad (42)$$

where $n\Delta t \leq t < (n+1)\Delta t$. Each of these expressions describes the operation of a ramp generator wherein the slope of the ramp is a function of time. Note that $\tan_2[2\theta_r(t)]$ and $\cot_2[2\theta_r(t)]$ take on the values $\tan_{s1}[2\theta_r(n)]$ $\cot_1[2\theta_r(n)]$ respectively when $t=n\Delta t$ and provide linearly-interpolated values between these values for all other values of t. To avoid the accumulation of errors over time, the summation in the expression for the tangent should be forced to zero whenever $2\theta_r(t)$ equals an even multiple of $\pi/2$ radians and the summation in the expression for the cotangent should be forced to zero whenever $2\theta_r(t)$ equals an odd multiple of $\pi/2$ radians.

One or the other of the quantities $\tan_2[2\theta_r(t)]$ and $\cot_2[2\theta_r(t)]$ are supplied to the multiplexer 48 for use in generating the driving voltages $V_{xpk}(t)$, $V_{xnk}(t)$, $V_{ypk}(t)$, and $V_{ynk}(t)$ where k=1 denotes the use of $\tan_2[2\theta_r(t)]$ in their generation and k=2 denotes the use of $\cot_2[2\theta_r(t)]$ (see equations (3) and (4)). It is convenient to switch from k=1 to k=2 when $\tan_2[2\theta_r(t)]$ becomes greater than 1 or less than −1 and to switch from k=2 to k=1 when $\cot_2[2\theta_r(t)]$ becomes greater than 1 or less than −1. If this procedure is followed, there are no discontinuities in the driving voltages $V_{xpk}(t)$, $v_{xnk}(t)$, $V_{ypk}(t)$, and $V_{ynk}(t)$ (see equations (3) and (4)).

Still another approach to generating $\tan_2[2\theta_r(t)]$ and $\cot_2[2\theta_r(t)]$ is to utilize the equations $$\tan_2[2\theta_r(t)] = \int G(t, \Delta\{\tan_1[2\theta_r(n)]\})dt \quad (43)$$

$$\cot_2[2\theta_r(t)] = \int G(t, \Delta\{\cot_1[2\theta_r(n)]\})dt \quad (44)$$

where G is an analog function of t defined in such a way as to make the above equations valid. The integral in the expression for the tangent is initialized to zero whenever $2\theta_r(t)$ equals an even multiple of $\pi/2$ radians and the integral in the expression for the cotangent is initialized to zero whenever $2\theta_r(t)$ equals an odd multiple of $\pi/2$ radians. The index n is defined in terms of t by the expression $n\Delta t \leq t <(n+1)\Delta t$.

One possible G is a constant-pulse-width pulse train with a pulse repetition period equal to $\Delta t$ divided by an integer wherein the pulses for values of t in the range $n\Delta t \leq t<(n+1)\Delta t$ have an amplitude proportional to $\Delta\{\tan_1[2\theta_r(n)]\}$ or $\Delta\{\cot_1[2\theta_r(n)]\}$. A digital-to-analog conversion of $\Delta\{\tan_1[2\theta_r(n)]\}$ or $\Delta\{\tan_1[2\theta_r(n)]\}$ is an example of an implementation of this type of G.

Another possible G is a constant-amplitude pulse train with a pulse repetition period equal to $\Delta t$ divided by an integer wherein the pulses for values of t in the range $n\Delta t \leq t<(n+1)\Delta t$ have a width proportional to $\Delta\{\tan_1[2\theta_r(n)]\}$ or $\Delta\{\cot_1[2\theta_r(n)]\}$.

Still another possible G is a constant-amplitude, constant-pulse-width pulse train wherein the pulse repetition frequency for the range $n\Delta t \leq t<(n+1)\Delta t$ has a value proportional to $\Delta\{\tan_1[2\theta_r(n)]\}$ or $\Delta\{\cot_1[2\theta_r(n)]\}$.

The outputs of the control unit 50 are the functions $U_{xp}(t)$, $U_{xn}(t)$, $U_{yp}(t)$, and $U_{yn}(t)$ together with the tangent or the cotangent of $2\theta_r(t)$, which are all supplied to multiplexer 48.

Additional details concerning vibratory rotation sensors are contained in U.S. Pat. No. 4,951,508 by Loper, Jr. et al. dated Aug. 28, 1990 which is incorporated by reference.

What is claimed is:

1. A method for generating a plurality of driving signals for a vibratory rotation sensor, the plurality of driving signals resulting in a plurality of readout signals from the vibratory rotation sensor, the method comprising the steps:

(a) determining a 2× tracking angle rate, the 2× tracking angle rate being the time rate of change of twice the tracking angle or a quantity proportional thereto, the tracking angle being an angle which tracks the orientation angle of the standing-wave pattern of the vibratory rotation sensor, the 2× tracking angle rate being determined from the plurality of readout signals;

(b) transforming the 2× tracking angle rate into a trig function rate, the trig function rate being the time rate of change of a first trig function, the first trig function being an approximation to a mathematically-exact (M-E) trig function or a function proportional thereto, the M-E trig function being selected from the group consisting of the tangent of twice the tracking angle and the cotangent of twice the tracking angle;

(c) transforming the trig function rate into a second trig function, the second trig function being an approximation to the M-E trig function or a function proportional thereto;

(d) generating the plurality of driving signals utilizing the second trig function.

2. The method of claim 1 wherein step (b) comprises the steps:

generating a transforming function;

forming the product of the transforming function and the 2× tracking angle rate to obtain the trig function rate.

3. The method of claim 2 wherein the transforming function is the product of minus 1 raised to the p'th power and the sum of one and the first trig function squared, p being equal to 2 if the first trig function is an approximation to the tangent of twice the tracking angle, p being equal to 1 if the first trig function is an approximation to the cotangent of twice the tracking angle.

4. The method of claim 1 wherein step (b) utilizes values of the 2× tracking angle rate to obtain values of the trig function rate at uniform intervals numbered by consecutive integers, a value corresponding to the beginning of the n'th time interval being called the n'th value.

5. The method of claim 4 wherein step (b) comprises the steps:

determining the n'th value of the time derivative of the first trig function to obtain the n'th value of the trig function rate;

summing the n'th value of the first trig function and the n'th value of the trig function rate multiplied by the time interval duration to obtain the (n+1)'th value of the first trig function.

6. The method of claim 4 wherein step (b) comprises the steps:

substituting the n'th value of the first trig function in a transforming function to obtain the n'th value of the transforming function;

multiplying the n'th value of the transforming function by the n'th value of the 2× delta tracking angle to obtain the n'th value of a delta trig function, the n'th value of the 2× delta tracking angle being the difference of the (n+1)'th and the n'th values of twice the tracking angle, the n'th value of the delta trig function being the difference of the (n+1)'th and the n'th values of the first trig function;

dividing the n'th value of the delta trig function by the time interval duration to obtain the n'th value of the trig function rate;

summing the n'th value of the first trig function and the n'th value of the delta trig function to obtain the (n+1)'th value of the first trig function.

7. The method of claim 6 wherein the transforming function is the product of minus 1 raised to the p'th power and the sum of one and the first trig function squared, p being equal to 2 if the first trig function is an approximation to the tangent of twice the tracking angle, p being equal to 1 if the first trig function is an approximation to the cotangent of twice the tracking angle.

8. The method of claim 4 wherein step (b) comprises the steps:

substituting n'th values in a transforming function of the first trig function and a 2× delta tracking angle to determine the (n+1)'th value of the first trig function, the n'th value of the 2× delta tracking angle being twice the difference of the (n+1)'th value and the n'th value of the tracking angle;

taking the difference of the (n+1)'th and n'th values of the first trig function and dividing the difference by the interval duration to obtain the n'th value of the trig function rate.

9. The method of claim 8 wherein the transforming function is the product of three factors, the first factor being the sum of the first trig function and the product of minus one raised to the p'th power and the 2× delta tracking angle, the second factor being the sum of one and the product of minus one raised to the p'th power, the first trig function, and the 2× delta tracking angle, the third factor being the sum of one and the first trig function squared, p being equal to 2 if the first trig function is an approximation to the tangent of twice the tracking angle, p being equal to 1 if the first trig function is an approximation to the cotangent of twice the tracking angle.

10. The method of claim 4 wherein step (b) comprises the steps:

substituting n'th values in a transforming function of the first trig function and a 2× delta tracking angle to determine the n'th value of the delta trig function, the n'th value of the 2× delta tracking angle being twice the difference of the (n+1)'th value and the n'th value of the tracking angle, the n'th value of the delta trig function being the difference of the (n+1)'th value and the n'th value of the first trig function;

dividing the n'th value of the delta trig function by the time interval duration to obtain the n'th value of the trig function rate;

adding the n'th values of the first trig function and the delta trig function to obtain the (n+1)'th value of the first trig function.

11. The method of claim 10 wherein the transforming function is the sum of a 2×p delta tracking angle and a product of two factors, the first tractor being the sum of the first trig function and the 2×p delta tracking angle, the second factor being the sum of three terms, the first term being the product of the first trig function and the 2×p delta tracking angle, the second term being the product squared of the first trig function and the 2×p delta tracking angle, the third term being the product cubed of the first trig function and the 2×p delta tracking angle, the 2×p delta tracking angle being the product of minus one raised to the p'th power and the 2× delta tracking angle, p being equal to 2 if the first trig function is an approximation to the tangent of twice the tracking angle, p being equal to 1 if the first trig function is an approximation to the cotangent of twice the tracking angle.

12. The method of claim 4 wherein step (c) comprises the steps:

generating a rate function of time whereby the rate function equals the n'th value of the trig function rate when $n\Delta t \leq t < (n+1)\Delta t$;

integrating the rate function to obtain the second trig function.

13. The method of claim 4 wherein the second trig function consists of a plurality of straight-line segments, one straight-line segment in each of the time intervals, the end points of a straight-line segment in any time interval coinciding with end points of the straight-line segments in adjacent time intervals, the slope of the straight-line segment in the n'th time interval being equal to the n'th value of the trig function rate.

14. The method of claim 4 wherein step (c) comprises the step:

generating a carrier function, the carrier function being a function of time and trig function rate, the integration of the carrier function with respect to time resulting in the second trig function.

15. The method of claim 14 wherein the carrier function is a pulse train having a plurality of pulses during each time interval, the pulse repetition rate of the pulse train being fixed, the pulse widths of the pulses in the pulse train being the same, the amplitude of the pulses in the n'th time interval being proportional to the n'th value of the trig function rate.

16. The method of claim 14 wherein the carrier function is a pulse train having a plurality of pulses during each time interval, the pulse repetition rate of the pulse train being fixed, the amplitudes of the pulses in the pulse train being the same, the width of the pulses in the n'th time interval being proportional to the n'th value of the trig function rate.

17. The method of claim 14 wherein the carrier function is a pulse train having a plurality of pulses during each time interval, the amplitudes and widths of the pulses in the pulse train being the same, the pulse repetition rate of the pulse train in the n'th time interval being proportional to the n'th value of the trig function rate.

18. An apparatus for practicing the method of claim 1.

19. An apparatus for generating a plurality of driving signals for a vibratory rotation sensor, the plurality of driving signals resulting in a plurality of readout signals from the vibratory rotation sensor, the apparatus comprising:

(a) a means for determining a 2× tracking angle rate, the 2× tracking angle rate being the time rate of change of twice the tracking angle or a quantity proportional thereto, the tracking angle being an angle which tracks the orientation angle of the standing-wave pattern of the vibratory rotation sensor, the 2× tracking angle rate being determined from the plurality of readout signals;

(b) a means for transforming the 2× tracking angle rate into a trig function rate, the trig function rate being the time rate of change of a first trig function, the first trig function being an approximation to a mathematically-exact (M-E) trig function or a function proportional thereto, the M-E trig function being selected from the group consisting of the tangent of twice the tracking angle and the cotangent of twice the tracking angle;

(c) a means for transforming the trig function rate into a second trig function, the second trig function being an approximation to the M-E trig function or a function proportional thereto;

(d) a means generating the plurality of driving signals utilizing the second trig function.

20. The apparatus of claim 19 wherein means (b) comprises:

a means for generating a transforming function;

a means for forming the product of the transforming function and the 2× tracking angle rate to obtain the trig function rate.

21. The apparatus of claim 20 wherein the transforming function is the product of minus 1 raised to the p'th power and the sum of one and the first trig function squared, p being equal to 2 if the first trig function is an approximation to the tangent of twice the tracking angle, p being equal to 1 if the first trig function is an approximation to the cotangent of twice the tracking angle.

22. The apparatus of claim 19 wherein means (b) utilizes values of the 2× tracking angle rate to obtain values of the trig function rate at uniform intervals numbered by consecutive integers, a value corresponding to the beginning of the n'th time interval being called the n'th value.

23. The apparatus of claim 22 wherein means (b) comprises the steps:

a means for determining the n'th value of the time derivative of the first trig function to obtain the n'th value of the trig function rate;

a means for summing the n'th value of the first trig function and the n'th value of the trig function rate multiplied by the time interval duration to obtain the (n+1)'th value of the first trig function.

24. The apparatus of claim 22 wherein means (b) comprises the steps:

a means for substituting the n'th value of the first trig function in a transforming function to obtain the n'th value of the transforming function;

a means for multiplying the n'th value of the transforming function by the n'th value of the 2× delta tracking angle to obtain the n'th value of a delta trig function, the n'th value of the 2× delta tracking angle being the difference of the (n+1)'th and the n'th values of twice the tracking angle, the n'th value of the delta trig function being the difference of the (n+1)'th and the n'th values of the first trig function;

a means for dividing the n'th value of the delta trig function by the time interval duration to obtain the n'th value of the trig function rate;

a means for summing the n'th value of the first trig function and the n'th value of the delta trig function to obtain the (n+1)'th value of the first trig function.

25. The apparatus of claim 24 wherein the transforming function is the product of minus 1 raised to the p'th power and the sum of one and the first trig function squared, p being equal to 2 if the first trig function is an approximation to the tangent of twice the tracking angle, p being equal to 1 if the first trig function is an approximation to the cotangent of twice the tracking angle.

26. The apparatus of claim 22 wherein means (b) comprises:

a means for substituting n'th values in a transforming function of the first trig function and a 2× delta tracking angle to determine the (n+1)'th value of the first trig function, the n'th value of the 2× delta tracking angle being twice the difference of the (n+1)'th value and the n'th value of the tracking angle;

a means for taking the difference of the (n+1)'th and n'th values of the first trig function and dividing the difference by the interval duration to obtain the n'th value of the trig function rate.

27. The apparatus of claim 26 wherein the transforming function is the product of three factors, the first factor being the sum of the first trig function and the product of minus one raised to the p'th power and the 2× delta tracking angle, the second factor being the sum of one and the product of minus one raised to the p'th power, the first trig function, and the 2× delta tracking angle, the third factor being the sum of one and the first trig function squared, p being equal to 2 if the first trig function is an approximation to the tangent of twice the tracking angle, p being equal to 1 if the first trig function is an approximation to the cotangent of twice the tracking angle.

28. The apparatus of claim 22 wherein means (b) comprises:

a means for substituting n'th values in a transforming function of the first trig function and a 2× delta tracking angle to determine the n'th value of the delta trig function, the n'th value of the 2× delta tracking angle being twice the difference of the (n+1)'th value and the n'th value of the tracking angle, the n'th value of the delta trig function being the difference of the (n+1)'th value and the n'th value of the first trig function;

a means for dividing the n'th value of the delta trig function by the time interval duration to obtain the n'th value of the trig function rate;

a means for adding the n'th values of the first trig function and the delta trig function to obtain the (n+1)'th value of the first trig function.

29. The apparatus of claim 28 wherein the transforming function is the sum of a 2×p delta tracking angle and a product of two factors, the first factor being the sum of the first trig function and the 2×p delta tracking angle, the second factor being the sum of three terms, the first term being the product of the first trig function and the 2×p delta tracking angle, the second term being the product squared of the first trig function and the 2×p delta tracking angle, the third term being the product cubed of the first trig function and the 2×p delta tracking angle, the 2×p delta tracking angle being the product of minus one raised to the p'th power and the 2× delta tracking angle, p being equal to 2 if the first trig function is an approximation to the tangent of twice the tracking angle, p being equal to 1 if the first trig function is an approximation to the cotangent of twice the tracking angle.

30. The apparatus of claim 22 wherein means (c) comprises:

a means for generating a rate function of time whereby the rate function equals the n'th value of the trig function rate when $n\Delta t \leq t < (n+1)\Delta t$;

a means for integrating the rate function to obtain the second trig function.

31. The apparatus of claim 22 wherein the second trig function consists of a plurality of straight-line segments, one straight-line segment in each of the time intervals, the end points of a straight-line segment in any time interval coinciding with end points of the straight-line segments in adjacent time intervals, the slope of the straight-line segment in the n'th time interval being equal to the n'th value of the trig function rate.

32. The apparatus of claim 22 wherein means (c) comprises:

a means for generating a carrier function, the carrier function being a function of time and trig function rate, the integration of the carrier function with respect to time resulting in the second trig function.

33. The apparatus of claim 32 wherein the carrier function is a pulse train having a plurality of pulses during each time interval, the pulse repetition rate of the pulse train being fixed, the pulse widths of the pulses in the pulse train being the same, the amplitude of the pulses in the n'th time interval being proportional to the n'th value of the trig function rate.

34. The apparatus of claim 32 wherein the carrier function is a pulse train having a plurality of pulses during each time interval, the pulse repetition rate of the pulse train being fixed, the amplitudes of the pulses in the pulse train being the same, the width of the pulses in the n'th time interval being proportional the n'th value of the trig function rate.

35. The apparatus of claim 32 wherein the carrier function is a pulse train having a plurality of pulses during each time interval, the amplitudes and widths of the pulses in the pulse train being the same, the pulse repetition rate of the pulse train in the n'th time interval being proportional to the n'th value of the trig function rate.

* * * * *